Feb. 27, 1951                L. M. SWIFT              2,543,675
METHOD AND APPARATUS FOR ADJUSTING SPACING
BETWEEN NEUTRON SOURCE AND DETECTOR
Filed July 15, 1948
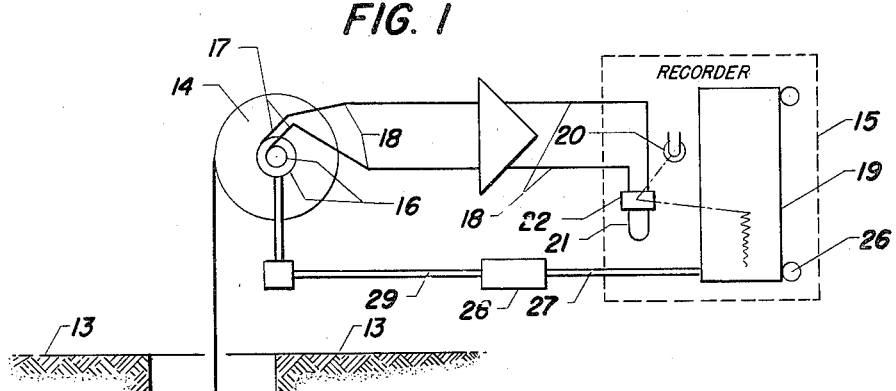
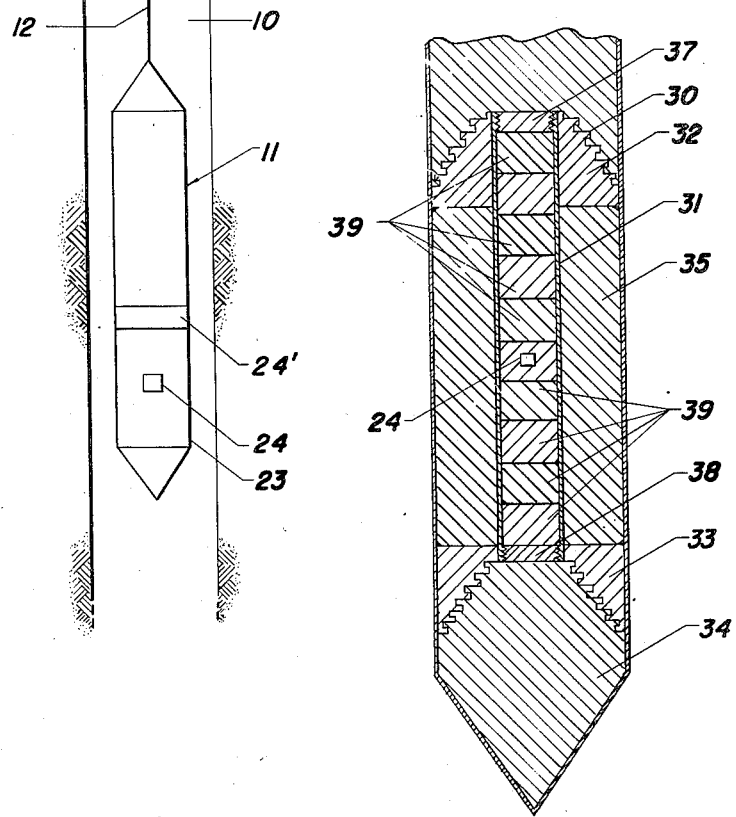
*INVENTOR.*
LAWRENCE M. SWIFT
BY *James Y. Cleveland*
ATTORNEY Patented Feb. 27, 1951

2,543,675

UNITED STATES PATENT OFFICE 2,543,675

METHOD AND APPARATUS FOR ADJUSTING SPACING BETWEEN NEUTRON SOURCE AND DETECTOR

Lawrence M. Swift, Tulsa, Okla., assignor to Well Surveys, Incorporated, Tulsa, Okla., a corporation of Delaware Application July 15, 1948, Serial No. 38,824

5 Claims. (Cl. 250—83.6)

This invention relates generally to the art of well surveying and more particularly to radioactivity well surveying in which a source of primary radiations is used.

The method of well surveying to which this invention specifically has application is that which comprises traversing a drill hole with a capsule which contains a source of primary radiations and detecting apparatus for detecting secondary radiation produced by the nuclear disintegration of the strata adjacent the drill hole when bombarded with the primary radiation. In conducting surveys of this character it has been found advantageous to place the source of primary radiations in a sub that is adapted to be secured to the bottom of the detector, thereby consolidating all of the apparatus that is to be lowered into the drill hole into a compact capsule that can be streamlined so that the fluid within the drill hole will offer a minimum of resistance to its passage. Additionally, it has been discovered that the spacing of the source of the primary radiations from the detector is an important factor in conducting these surveys. For example, a log obtained, using the source spaced from the detector by a distance of 12" will not have the same characteristics as one obtained with the source spaced a distance of 6" from the detecting instrument. Since, in particular areas, logs obtained by critically spacing the source of primary radiation from the detector are more desirable than those obtained by any other than the selected spacing, it is desirable to provide means whereby this spacing can be easily and quickly altered without dangerously exposing the operator who makes the adjustment to the source of radiations.

Therefore, the primary object of this invention is to provide means for varying the spacing of the primary source of radiation from the detecting instrument without unnecessarily exposing the operator to direct radiation from the source.

Another object of this invention resides in the provision of a primary source shield that is adapted to be attached directly to the bottom of the detecting instrument.

Still another object of this invention resides in the provision of a primary source shield having a longitudinal cylindrical passageway in which the source of radiation is adapted to be housed.

This invention further contemplates the provision of lead spacers that are cylindrical in form and of definite length which are adapted to fit in the longitudinal passageway both above and below the primary source.

Other objects and advantages of the present invention will become apparent from the following detailed description when considered with the drawings in which Figure 1 is a diagrammatic illustration of a well surveying operation employing the present invention;

Figure 2 is an enlarged vertical sectional view of the bottom end of the capsule, shown in Figure 1, showing the source spacers and detector in operative relationship; and Figure 3 is a perspective view of one of the lead spacers.

Referring to the drawings in detail, particularly Figure 1, there is illustrated diagrammatically a well surveying operation in which there is shown disposed within a drill hole 10, a capsule 11 that is adapted to be raised and lowered in the drill hole by a cable 12. Cable 12 extends from the capsule 11 out the mouth of the drill hole at the surface of the earth 13 to a supply drum 14. Drum 14 is driven by a conventional source of power, not shown, to raise and lower the capsule 11 in the drill hole 10. Electrical connections are made between a detecting device housed within the upper portion of the capsule 11 and a recorder 15 through one or more conductors carried inside the cable 12, slip rings 16, brushes 17 and conductors 18 to the recorder 15. Recorder 15 is illustrated as comprising a moving strip of recorder paper 19, a light source 20, a vibrating element 21 and a mirror 22 carried thereby. Light from the source 20 is reflected from mirror 22 onto the recorder strip 19 to photographically expose a trace thereon. It is to be understood that other types of recording devices such as the conventional pen recorder may be used. In order to correlate the trace on the recorder strip 19 with depth at which the recorded signals originated, the take-up roll 26 of the recorder may be driven through means of the shaft 27, speed changing gears in the box 28, shaft 29 and the drum 14.

Attached to and forming a part of the capsule 11 is a housing 23 which carries a source of primary radiations 24. Housing 23 is connected to the bottom of the capsule 11 through means of a sub 24'. Detailed description of the primary source and its housing follows while reference will be made to Figure 2.

Sources of primary radiation usually comprise radium, radium and an element such as beryllium, or other elements alone or in combination that will produce penetrating radiation. The radiations from these sources are extremely penetrating and are dangerous to the operators if they are exposed for any substantial time to them. This is particularly true where it is necessary for the operator to expose parts of his body to the source from a very short distance. Therefore, it is necessary to provide for the safety of the operators by employing as much shielding material around the source as is practical.

Where a well is being surveyed by using neutrons as the primary radiation the source usually comprises a beryllium target material that is bombarded by alpha rays given off by an alpha rayer such as radium. Since appreciable quantities of gamma rays are produced at the same time a lead shield is usually placed around the source so that these gamma rays will be attenuated and yet the neutrons will not be appreciably slowed down. It is desirable to maintain a maximum thickness of lead shielding on all sides of the source to provide adequate protection of the operator from the gamma rays given off by the source. In addition to protecting the operator from the gamma radiation given off by the source, the lead shield serves to attenuate the gamma radiation which would be scattered by the walls of the drill hole and reach the detector.

This scattered gamma radiation is undesirable since it would tend to obscure the record made of the gamma radiation produced in the strata by irradiating the strata with neutrons. Additionally, it is desirable to maintain a shield of substantial thickness at all times between the source and the detecting instrument so that the radiation detected by the detecting instrument will not be primary radiations but radiations from the strata surrounding the drill hole.

As shown in Figure 2, the bottom of the capsule which houses the detector is provided with tool-joint threads 30 that are adapted to engage like threads carried by the upper end of the sub in which the source of radiation is disposed. The sub 24' is cylindrical in form and may have the same external dimensions as the capsule housing the detector. The sub comprises at its inner end a steel cylindrical tube 31 which is concentrically located about the longitudinal axis of the instrument. This tube 31 serves as a chamber in which the source of radiation 24 can be moved to adjust its distance or spacing from the radiation detector. Opposite ends of the tube 31 carry steel tube joints. The top end of the tube being provided with a male member of a tool joint and the bottom end of the tube being provided with a female end of a tool joint. The top tool joint element 32 as recited above is adapted to engage like threads 30 provided in the bottom end of the capsule which houses the detector. The bottom tool joint element 33 is adapted to receive a plug 34 which seals the passageway through the cylindrical element 31. It is to be noted that plug 34 is streamlined to reduce resistance to its passage through the fluid in the drill hole. Tube 31 has disposed about it a substantial thickness of lead 35 which as pointed out above serves to not only protect the operator from the gamma radiation given off by the source but to attenuate the gamma radiation so that it will not be scattered by the walls of the drill hole and reach the detecting instrument.

The lead shield 35 is enclosed in a steel cylindrical housing 36. The housing 36 in addition to serving the function of protecting the soft lead from the walls of the drill hole provides a hard surface which can be engaged by wrenches for the purpose of securing the sub in operative position or removing it from a detecting instrument. The steel outer shell or housing 36 is secured to the tool joint members 32 and 33 at the opposite ends of the sub as by welding. In order to effectively seal the interior of the cylindrical element 31 additional plugs 37 and 38 threadedly engage the top and bottom, respectively, of this tube.

Inside of tube 31 there is disposed in addition to the source 24 lead spacer elements 39. One of these elements is shown in perspective in Figure 3. These cylindrical lead slugs may vary in length from ½" to as much as 2" or more, dependent upon the degree of accuracy with which it is desired to space the source 24 from the detecting instrument.

A variation in the spacing is effected by removing the sub from the detector housing and removing the streamlined plug 34 from the bottom end thereof. The next step is to remove the plugs 37 and 38 which seal opposite ends of the cylindrical tube 31. After this has been done it is only necessary to take a slug from one end of the chamber inside of tube 31 and place it in the opposite end of the tube. This process can be carried out to effect a closer spacing of the source from the detector or to effect a greater spacing of the source from the detector, it being only necessary to trade the slugs of lead from one end to the other to advance the source along the chamber inside of tube 31 to any desired position. It is readily apparent that the source is at all times shielded by any number of lead slugs that are maintained in position on either side of the source.

In the event that an ionization chamber of the type that is adapted to detect neutrons is used it may be desirable to use in the place of one or more of the topmost lead slugs slugs of paraffin or some other hydrogenaceous substance which will effectively shield the ionization chamber from neutron radiation travelling vertically from the source to the ionization chamber. It is obvious that with the teachings of the present invention before one, many modifications of it can be made, for example, steel inserts may be placed between the tool joint member 32 and the bottom end of the detector housing to increase the distance between the source and the detector without molesting the lead slugs which have been interposed between the source and the detector. Additionally, it is apparent from the drawings, particularly Figure 2, that when it is desired to conduct a survey of the natural radioactivity of the strata penetrated by a drill hole, it is only necessary to remove the sub 23 from the bottom end of the detector and take the plug 34 out of the bottom end of the sub and insert it in the tool joint carried by the bottom of the detector housing. This will provide the detector housing with the necessary streamlining which will reduce friction offered by the fluid to its passage in a drill hole.

I claim:

1. A radioactivity well surveying apparatus adapted to traverse a well that comprises an elongated housing, a detector in said housing, means defining a cylindrical axial passageway in a portion of said housing that extends at one end to a point adjacent the detector, a source of primary radiation movably disposed in said passageway, a plurality of cylindrical slugs adapted to be inserted in said passageway above and below said source of radiation, whereby the space between the source and detector can be adjusted.

2. A radioactivity well surveying apparatus adapted to traverse a well that comprises an elongated housing, a detector in said housing, means defining a cylindrical axial passageway in a portion of said housing that extends at one end to a point adjacent the detector, a source of primary radiation movably disposed in said passageway, a plurality of cylindrical radiation attenuating slugs adapted to be inserted in said passageway above and below said source of radiation, whereby the space between the source and detector can be adjusted.

3. A radioactivity well surveying apparatus adapted to traverse a well that comprises an elongated housing, a detector in said housing, means defining a cylindrical axial pasageway in a portion of said housing that extends at one end to a point adjacent the detector, a source of primary radiation movably disposed in said passageway, a plurality of cylindrical slugs adapted to be inserted in said passageway above and below said source of radiation, whereby the space between the source and detector can be adjusted, said slugs being relatively short and uniform in length.

4. A radioactivity well surveying apparatus adapted to traverse a well that comprises an elongated housing, a detector in said housing, means defining a cylindrical axial passageway in a portion of said housing that extends at one end to a point adjacent the detector, a source of primary radiation movably disposed in said passageway, a plurality of cylindrical lead slugs adapted to be inserted in said passageway above and below said source of radiation, whereby the space between the source and detector can be adjusted.

5. A radioactivity well surveying apparatus adapted to traverse a well that comprises an elongated housing, a detector in said housing, means defining a cylindrical axial passageway in a portion of said housing that extends at one end to a point adjacent the detector, a source of primary radiation movably disposed in said passageway, a plurality of cylindrical slugs having a density that is at least equal to that of lead adapted to be inserted in said passageway above and below said source of radiation, whereby the space between the source and detector can be adjusted.

LAWRENCE M. SWIFT.

REFERENCES CITED

The following references are of record in the file of this patent:

UNITED STATES PATENTS

| Number | Name | Date |
|---|---|---|
| 2,353,619 | Pontecorvo et al. | July 11, 1944 |
| 2,365,763 | Kalb et al. | Dec. 26, 1944 |
| 2,508,772 | Pontecorvo | May 23, 1950 |